United States Patent [19]

Carpio

[11] Patent Number: 5,439,569

[45] Date of Patent: * Aug. 8, 1995

[54] CONCENTRATION MEASUREMENT AND CONTROL OF HYDROGEN PEROXIDE AND ACID/BASE COMPONENT IN A SEMICONDUCTOR BATH

[75] Inventor: Ronald A. Carpio, Austin, Tex.

[73] Assignee: Sematech, Inc., Austin, Tex.

[*] Notice: The portion of the term of this patent subsequent to Nov. 13, 2011 has been disclaimed.

[21] Appl. No.: 277,688

[22] Filed: Jul. 20, 1994

Related U.S. Application Data

[63] Continuation-in-part of Ser. No. 17,224, Feb. 12, 1993, Pat. No. 5,364,510.

[51] Int. Cl.6 .................................... G01N 27/26
[52] U.S. Cl. ................... 204/153.1; 204/153.12; 204/409; 204/406; 204/434; 204/412; 422/68.1; 422/81; 422/82.01; 422/82.02
[58] Field of Search ............... 204/409, 406, 434, 412, 204/153.12, 153.1; 422/68.1, 81, 82.01, 82.02

[56] References Cited

U.S. PATENT DOCUMENTS

| | | | |
|---|---|---|---|
| 2,617,940 | 11/1952 | Giguere | 250/43.5 |
| 3,387,496 | 6/1968 | Broerman | 73/422 |
| 3,539,455 | 11/1970 | Clark, Jr. | 204/1 |
| 3,902,970 | 9/1975 | Levin | 195/103 |
| 4,040,908 | 8/1977 | Clark, Jr. | 195/103 |
| 4,118,649 | 10/1978 | Shwartzman et al. | 310/337 |
| 4,170,520 | 10/1979 | Weaver | 435/288 |
| 4,197,369 | 4/1980 | Weaver | 435/12 |
| 4,212,938 | 7/1980 | Gruber et al. | 435/11 |
| 4,260,680 | 4/1981 | Muramatsu et al. | 435/14 |
| 4,326,940 | 4/1982 | Eckles et al. | 204/406 |
| 4,340,448 | 7/1982 | Schiller et al. | 204/1 |
| 4,353,983 | 10/1982 | Siddiqi | 435/11 |
| 4,427,772 | 1/1984 | Kodera et al. | 435/27 |
| 4,517,291 | 5/1985 | Seago | 435/14 |
| 4,525,265 | 6/1985 | Abe et al. | 204/403 |
| 4,680,271 | 7/1987 | Williams | 436/55 |
| 4,714,673 | 12/1987 | Kessler et al. | 435/14 |
| 4,857,152 | 8/1989 | Armstrong et al. | 204/1 |
| 4,874,501 | 10/1989 | Christiansen et al. | 204/415 |
| 4,875,972 | 10/1989 | Williams et al. | 156/664 |
| 4,875,973 | 10/1989 | Heikkila et al. | 156/664 |
| 4,886,590 | 12/1989 | Tittle | 204/406 |
| 4,909,908 | 3/1990 | Ross et al. | 204/1 |
| 4,915,781 | 4/1990 | Bohnen et al. | 156/664 |
| 4,937,038 | 6/1990 | Sakai et al. | 376/245 |
| 4,971,901 | 11/1990 | Hayashi et al. | 435/176 |
| 5,081,045 | 1/1992 | McGill | 436/135 |
| 5,206,145 | 4/1993 | Cattell | 204/153 |
| 5,223,222 | 6/1993 | Ricchio et al. | 204/409 |
| 5,225,321 | 7/1993 | Hayashi et al. | 204/153 |
| 5,364,510 | 11/1994 | Carpio | 204/153.1 |

OTHER PUBLICATIONS

"Dependence of Thin-Oxide Films Quality on Surface Microroughness", IEEE, Tadahiro Ohmi et al., vol. 39, No. 3, Mar. 1992, pp. 537–545.

"A Continuous Electrolytic Analyzer for Acidic or Basic Components of Process Gas Streams", Analytical Chemistry, R. L. Burnett et al., vol. 35(11) Oct. 1963, pp. 1709–1712.

"Electrodeless Conductivity, Chapter 29," Electrochemistry, Past and Present, ACS Symposium Series No. 390, Truman S. Light, pp. 429–441.

"Electrodeless Conductivity," Talanta, vol. 36, No. 12, Truman S. Light, Edward McHale and Kenneth Fletcher, 1989, pp. 235–241.

"Megasonic Particle Removal from Solid-State Wafers," RCA Review, vol. 46 Stanley Shwartzman, Alfred Mayer, Werner Kern, vol. 46, Mar. 1985, pp. 81–104.

"Cleaning Solutions Based on Hydrogen Peroxide for use in Silicon Semiconductor Technology," RCA Review, Werner Kern and David Puotinen, Jun. 1970, pp. 187–206.

Primary Examiner—John Niebling
Assistant Examiner—Bruce F. Bell
Attorney, Agent, or Firm—William W. Kidd

[57] ABSTRACT

A feedback control system for providing automated control of multi-component chemical concentrations in a hydrogen peroxide/ammonia (SC-1) aqueous bath or in a hydrogen peroxide/hydrochloric (SC-2) aqueous bath used for semiconductor processing. A sample from the liquid bath is routed to two sensors. Three separate schemes for determining concentrations of the two chemicals in the bath are provided by the selection of one of three separate pairs of sensors. A processor is used to monitor and control the chemical makeup of the bath.

19 Claims, 6 Drawing Sheets

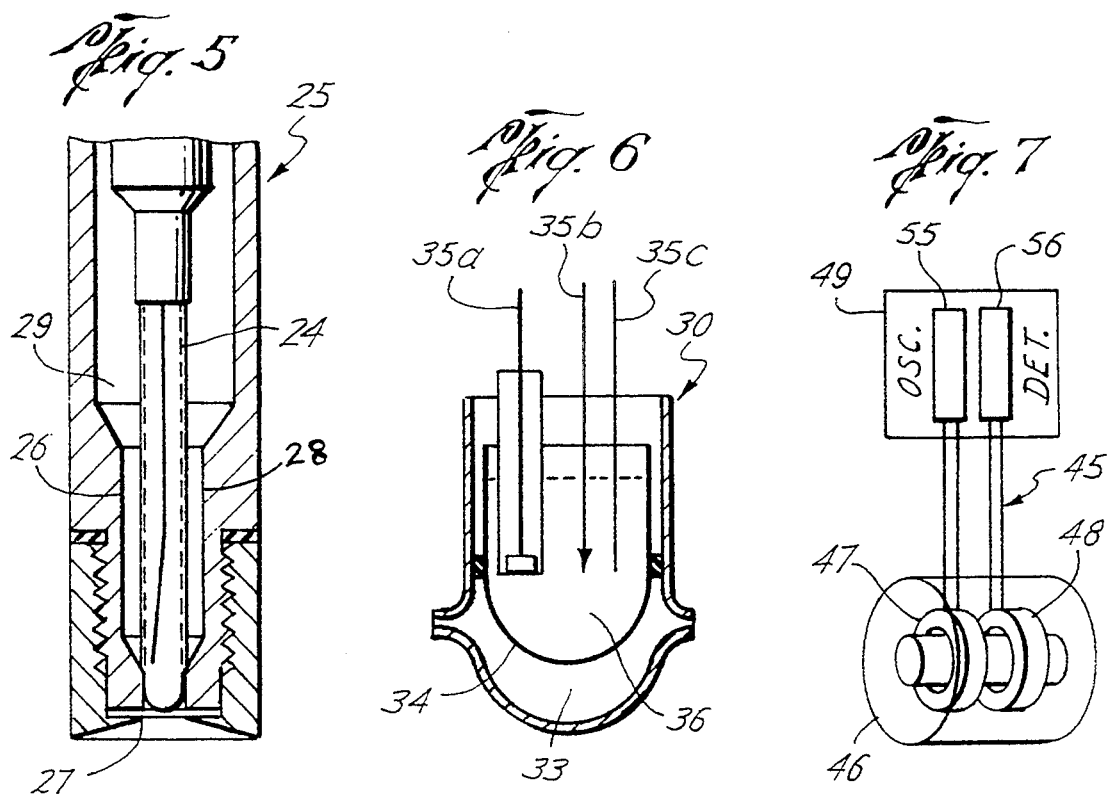
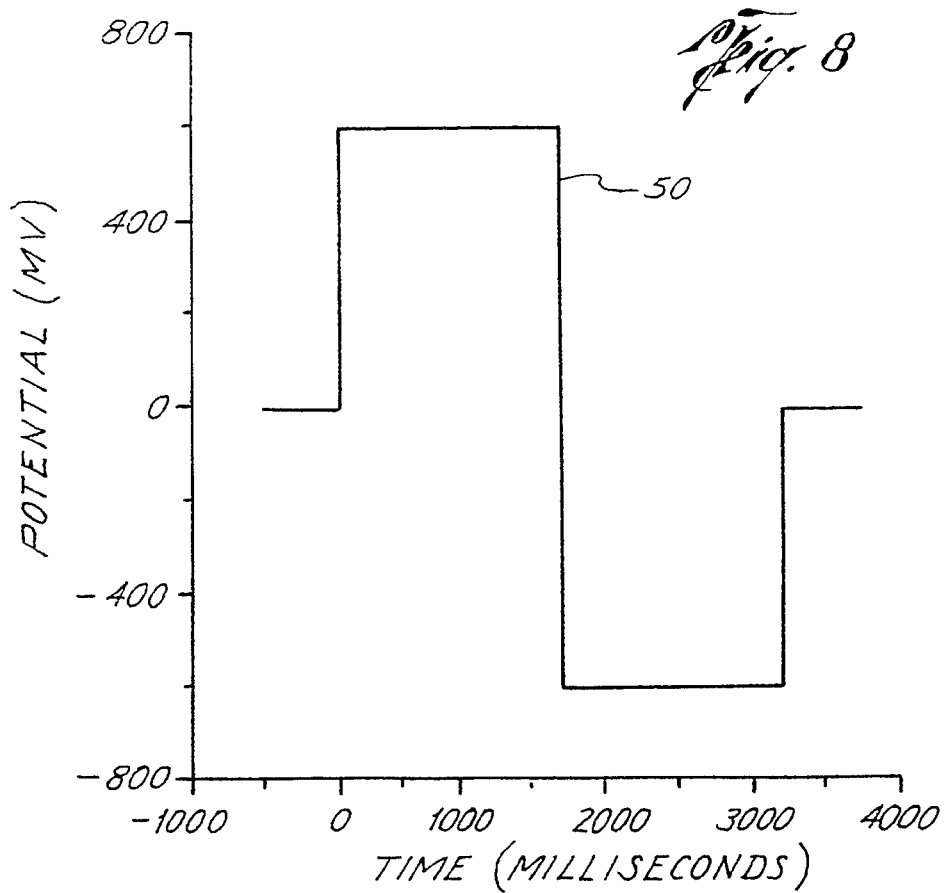

CONCENTRATION MEASUREMENT AND CONTROL OF HYDROGEN PEROXIDE AND ACID/BASE COMPONENT IN A SEMICONDUCTOR BATH

This is a continuation-in-part (C.I.P.) application of Ser. No. 08/017,224, now U.S. Pat. No. 5,364,510, filed on Feb. 12, 1993 and entitled "Scheme for Bath Chemistry Measurement and Control for Improved Semiconductor Wet Processing", which application is incorporated by reference herein.

BACKGROUND OF THE INVENTION

1. Field of the Invention

The present invention relates to the field of process chemical baths, particularly hydrogen peroxide containing baths, and more particularly, to a scheme for monitoring and controlling an aqueous bath comprised of hydrogen peroxide and a second chemical component, which is either an acid or a base, wherein the bath is utilized in semiconductor manufacturing.

2. Prior Art

Chemical solutions have been utilized extensively for the manufacture of semiconductor devices. Wet chemical processing baths have been used for cleaning semiconductor wafers, as well as for etching deposited films on these wafers. For example, the use of hydrogen peroxide ($H_2O_2$) containing solutions for cleaning silicon semiconductor wafers is well known. In addition to wafer cleaning, hydrogen peroxide is utilized in combination with sulfuric acid for photoresist removal and in combination with phosphoric acid, sulfuric acid or ammonium hydroxide for selective titanium etching.

It is known that to ensure uniform processing in advanced VLSI (very large scale integrated circuit) and ULSI (ultra large scale integrated circuit) manufacturing, it is critical to maintain a chemical composition of a bath at a specified concentration level. Alternatively, more uniform processing can be attained by measuring the solution concentration and adjusting the wafer processing time to compensate for changes in the solution composition. Maintaining specified concentration levels is especially complicated in hydrogen peroxide based solutions.

For example, a $NH_4OH$—$H_2O_2$—$H_2O$ solution (commonly referred to as SC-1) used in wafer cleaning, especially in megasonic baths, provides for the simultaneous removal of particles, organics and a number of trace metals (See for example, "Cleaning Solutions Based on Hydrogen Peroxide for use in Silicon Semiconductor Technology"; W. Kern and D. A. Puotinen; RCA Review, June 1970; pp. 187-206). In the SC-1 solution the bath is comprised of ammonium hydroxide ($NH_4OH$), hydrogen peroxide ($H_2O_2$) and water ($H_2O$). For semiconductor manufacturing, it is imperative to maintain the proper chemistry ratio of $NH_4OH$—$H_2O_2$—$H_2O$ in the bath. If the $NH_4OH/H_2O_2$ ratio is high, silicon etching can occur, resulting in the generation of surface roughness that can adversely affect gate oxide breakdown. If the $NH_4OH/H_2O_2$ ratio is too low, the particle removal rate is reduced and a higher iron contamination level may result.

Furthermore, many solutions, such as the SC-1 solution, are notoriously unstable due to the simultaneous loss of multiple components of the bath. In the SC-1 processing bath, $NH_3$ and $H_2O_2$ losses are attributable to a number of factors. The $H_2O_2$ decomposition ($2H_2O_2 > 2H_2O + O_2$) is dependent on concentration, pH and temperature. It is also well known that the presence of heavy metal contaminants affect the decomposition of $H_2O_2$. It is suspected that organic contaminants can affect the ratio of decomposition. For ammonia, the loss is primarily due to evaporation. It is also believed that some ammonia loss may be due to oxidation ($2NH_3 + 6OH^- > N_2 + 6H_2O + 6e^-$).

Thus, at most semiconductor fabrication facilities, a common approach has been to use a liquid processing bath for a certain time period without proper concentration adjustments to make up for the losses and then to discard it. This practice not only results in high chemical costs, but it also leads to the generation of more waste than would be required. Environmentally, it is preferred to reduce such waste. In more advanced manufacturing facilities, automated controllers are utilized to achieve some degree of chemical composition control. These controllers spike the bath with certain chemicals at predefined intervals and can also add one or more chemicals to the bath to make up for a drop in the bath liquid level. One automated approach is described in U.S. Pat. No. 4,326,940.

In the manufacture of state-of-the-art and future generations of semiconductor devices, it is appreciated that the specified tolerances for chemical composition in such baths will require tighter tolerances. In order to manufacture even smaller submicron semiconductor devices, as well as improving the manufacturing yield, it is imperative that automated schemes for maintaining a tighter control on the chemical make-up of a liquid processing bath is desired. In order to ensure uniform processing, such as uniform cleaning without surface damage, stripping and/or etching, it is imperative to continually monitor and, if necessary, appropriately adjust the concentration level of chemicals in an aqueous bath without human interaction.

In respect to SC-1 baths, a more advanced concentration control for $H_2O_2$ and $NH_3$ is desirable. What is needed is a workable sensor system for use in real-time process control. Characteristics which are desirable in both $H_2O_2$ and $NH_3$ sensors include simplicity, sensitivity, accuracy, reproducibility, dynamic range, speed, robustness, low cost, and commercial availability. Such sensors must be capable of withstanding the effects of a corrosive liquid at elevated temperatures and provisions are necessary to deal with the high concentration of bubbles which are present in this type of solution.

The present invention provides for a scheme in which substantially continuous, frequently repetitive and/or in-situ monitoring of a chemical bath, such as the SC-1 bath or a SC-2 bath (an SC-2 solution is comprised of $HCl$—$H_2O_2$—$H_2O$), is obtained to determine the concentration levels of the chemical species. Furthermore, such measured data can be analyzed and computed in order to automatically control the composition of the bath. Moreover, this scheme provides for an analytical methodology which can be most easily implemented in a semiconductor fabrication facility with reasonable cost, desired analytical accuracy and a lower probability of introducing deleterious contamination within the facility.

Additionally, it is appreciated that the concentration monitoring scheme described in the afore-mentioned original application can be utilized to provide the necessary control. However, it is also appreciated that added complexities are encountered in generating a diluted sample for analysis. For example, errors in the measurement of the diluted sample are multiplied when interpolated to calculate the particular chemical concentration in the bath. Additionally, the use of reagents and carrier streams are complicated by the requirement of additional plumbing, as well as the requirement of precision controls in manipulating the fluid flow. Thus, in some instances the dilution scheme of the original application operates effectively to provide the desired results, but in other instances it is preferable to obtain direct readings from a more simplified scheme. The present invention attempts to circumvent many of these complexities by utilizing a direct measurement scheme.

SUMMARY OF THE INVENTION

A hydrogen peroxide/ammonia processing bath analysis and feedback control system for semiconductor processing is described. A sample of a SC-1 solution is processed by electrochemical sensors to determine the concentrations of $H_2O_2$ and $NH_3$. Three approaches are defined in order to sense and measure the sample solution to determine the concentration levels. An application of the invention is extended to monitoring concentrations of hydrochloric acid (HCl) and $H_2O_2$ in a SC-2 solution.

A first approach relies on potentiometry to measure $NH_3$ concentration and amperometry to measure $H_2O_2$ concentration. A second approach relies on potentiometry to measure $NH_3$ concentration and ionic conductivity to determine $H_2O_2$ concentration. A third approach relies on amperometry to measure $H_2O_2$ concentration and ionic conductivity to determine $NH_3$ concentration. The use of ionic conductivity for determining the measurement of the second specie is made possible by the fact that the conductivity of these solutions can be fitted to an empirical equation in which the concentrations of $NH_3$ and $H_2O_2$ and the temperature are independent variables.

In order to provide automated measurement and control of wet baths, including in-situ control, a computer is coupled to control the various devices associated with transporting, injecting and analyzing the sampled liquid. By continuous or frequent sampling during use, chemicals can be readily added to the bath if parameters being controlled are out of tolerance.

BRIEF DESCRIPTION OF THE DRAWINGS

FIG. 5 is an illustration of a gas diffusion potentiometric sensor utilized in the practice of the present invention.

FIG. 6 is an illustration of an amperometric sensor utilized in the practice of the present invention.

FIG. 7 is an illustration of a electrodeless conductivity sensor utilized in the practice of the present invention.

FIG. 8 is a graphic illustration of a voltage waveform used to drive the amperometric sensor of FIG. 6 in the practice of the present invention.

DETAILED DESCRIPTION OF THE PREFERRED EMBODIMENTS

A hydrogen peroxide/ammonia wet processing bath measurement and analytical feedback control system for semiconductor wafer processing is described. In the following description, numerous specific details are set forth, such as specific devices, measuring techniques, chemical compositions, etc., in order to provide a thorough understanding of the present invention. However, it will be obvious to one skilled in the art that the present invention may be practiced without these specific details. In other instances, well known processes and structures have not been described in detail in order not to unnecessarily obscure the present invention.

It is to be noted that the particular chemical solution described primarily throughout is SC-1, which is used for wafer cleaning. A description referring to SC-2 is also provided as well. Furthermore, in reference to SC-1 the specific chemicals described below are hydrogen peroxide ($H_2O_2$) and ammonia ($NH_3$), which is derived from ammonium hydroxide ($NH_4OH$). These two chemical species are combined with water ($H_2O$). Such solutions for semiconductor processing are well-known in the prior art and such solutions can be readily purchased.

Initially, the present invention was developed for the purpose of controlling the concentration of $H_2O_2$ which was one of the composition chemicals in a wet bath, but was then extended to controlling the concentration level of a second chemical component of the bath. In this particular instance, the second chemical specie is $NH_3$. However, it is appreciated that the present invention can be readily adapted to other chemistries as well.

Figure 1:
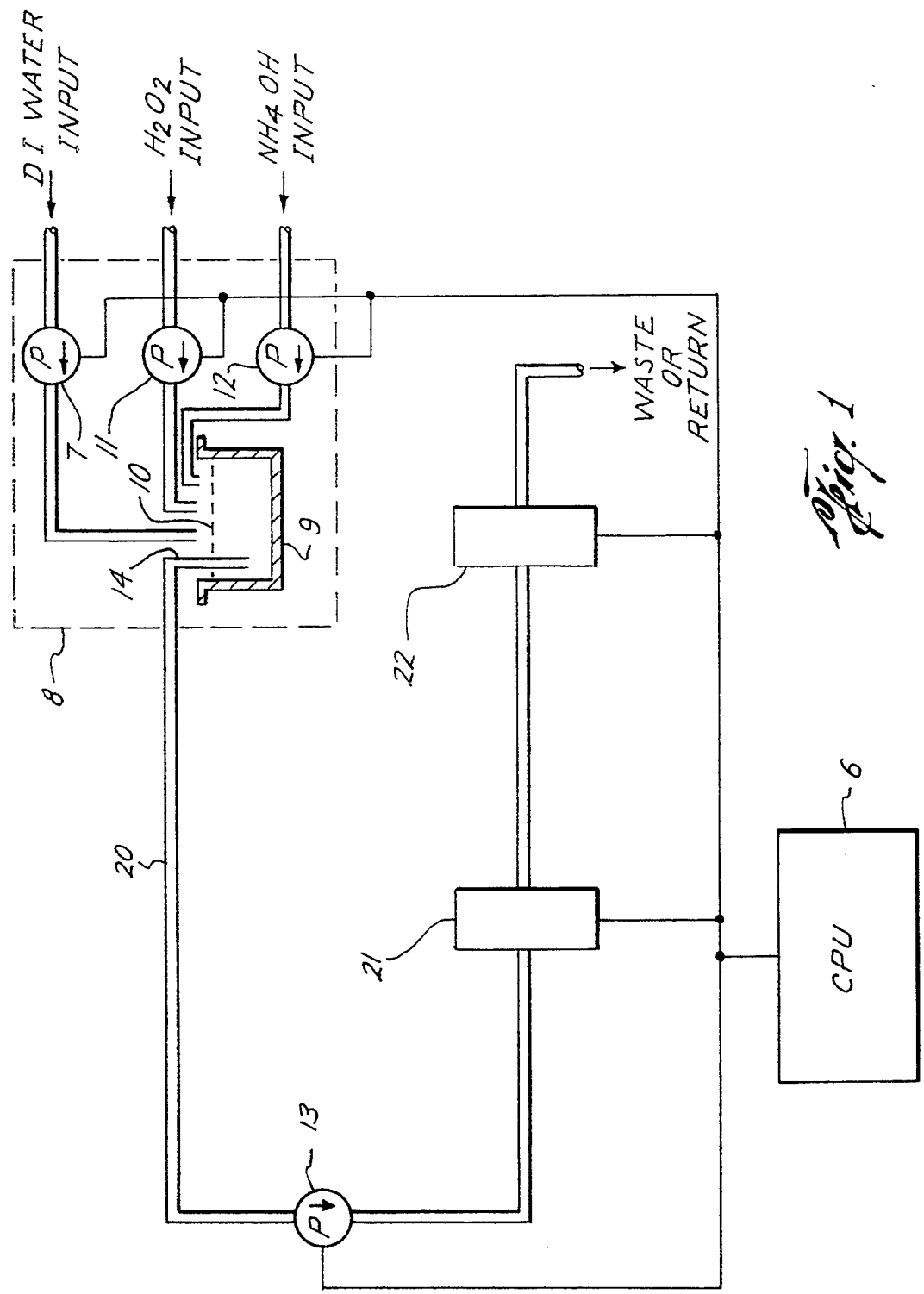
FIG. 1 is a schematic diagram of a measurement and control system of the present invention for a chemical wet bath utilizing dual sensors.

Referring to FIG. 1, a measurement, analysis and feedback control system for controlling chemical composition in an aqueous processing bath comprised of a SC-1 solution is shown. Bath 10, contained within enclosure 9, is utilized to provide a wet processing bath for one of a variety of wet processing techniques known for processing a semiconductor wafer. Generally, the SC-1 solution is used for megasonic cleaning of semiconductor wafers to remove particles, organics and/or trace metals (See for example, "Megasonic Particle Removal from Solid-State Wafers"; S. Shwartzman, A. Mayer and W. Kern; RCA Review Vol. 46; March 1985; pp. 81–105). The various chemicals are pumped from a chemical source (not shown). A chemical solution is pumped by the use of a chemical metering pump 11, which meters the amount of the particular chemical solution being introduced into bath 10. In this particular example, $H_2O_2$ solution is introduced through pump 11.

A second chemical solution is introduced into bath 10 by the use of a second chemical metering pump 12, which pumps the second chemical solution from a separate chemical source (not shown). In this particular example using a SC-1 solution, $NH_4OH$ is introduced through pump 12. Furthermore, a third metering pump 7 is utilized to meter and pump deionized (DI) water into bath 10.

It is to be appreciated that additional chemicals can be pumped into bath 10 from a separate source through additional chemical metering pumps and that only two chemistries are shown in FIG. 1 in order to simplify the explanation of the present invention. For example, sulfuric acid ($H_2SO_4$) can be combined with $H_2O_2$ for the purpose of stripping photoresist or other organics from a wafer.

Some other examples of $H_2O_2$ baths are:

$H_2O_2$—$H_3PO_4$—$H_2O$ for titanium etching and metal stripping;

$H_2O_2$—$NH_4OH$—$H_2O$ for wafer cleaning, particle/organic removal;

$H_2O_2$—$HCl$—$H_2O$ (SC-2 solution) for trace metal removal; and $H_2O_2$—$H_2O$ for wafer cleaning and metal removal.

Furthermore, it is to be noted that water, preferably DI water, is typically pumped into bath 10 for the purpose of diluting the solution to a desired level. Accordingly, the actual chemicals introduced into bath 10 will depend on the particular process desired. Emphasis is placed on $H_2O_2$, since it is a more readily used chemical in wet processing baths and is a component in the SC-1 solution. Typically, the second chemical component or specie present (noted in the example above as: $H_2SO_4$, $H_3PO_4$, $NH_4OH$, $HCl$ and $HF$) in semiconductor baths will have an acidic or basic property. With the SC-1 solution, the second specie is $NH_4OH$. With the SC-2 solution, the second specie is hydrochloric acid ($HCl$).

In FIG. 1, a sampling tube 14 is disposed within bath 10 in order to draw a sample of the solution from bath 10. It is to be appreciated that the manner in which the sample is taken is not essential to the operation of the present invention, as long as the sampling process does not introduce contaminants into bath 10. A slipstream sampling method, well known in the prior art, is another non-contaminating sampling technique available.

The bath 10 (and generally the metering pumps 7, 11 and 12) are part of an assembly usually contained within an equipment housing or cabinet and is accordingly shown as bath assembly 8. In the preferred embodiment, a sampling line 20 couples the sampled liquid to various sensors described below. When a sample is to be taken, a pump 13, coupled to line 20, is used to pump a solution sample from bath 10. It is to be appreciated that a number of known schemes can be readily utilized for taking a solution sample from bath 10 and transferring the sample to various sensors noted below.

In the simplified scheme of the preferred embodiment, the sample output from bath 10 is coupled to sensors 21 and 22. The sensors 21 and 22 are utilized for analyzing the sample from the bath to determine the concentration level of the two chemical species present in the bath. In this particular instance, sensors 21-22 determine the concentrations of $H_2O_2$ and $NH_3$ in the sample. Since the sample is undiluted, a direct indication of the bath 10 solution is presented to sensors 21-22. Once the sample is directed through the sensors 21-22, the sample remnant is sent to waste or returned to the system.

The sensors 21-22 can be of a variety of sensors for achieving the purpose of determining the concentration levels of the chemical species in the bath. With the practice of the present invention, the preference is to use electrochemical sensors. With the SC-1 solution, the sensors 21 and 22 are used to determine the concentrations of $NH_3$ and $H_2O_2$. Although the type of sensor to be utilized is a design choice, three schemes have been selected as the more preferred approaches. The detection scheme for the three approaches are noted below.

| Approach | For $NH_3$ | For $H_2O$ |
|---|---|---|
| A | Potentiometry | Amperometry |
| B | Potentiometry | Conductivity |
| C | Conductivity | Amperometry |

Figure 2:
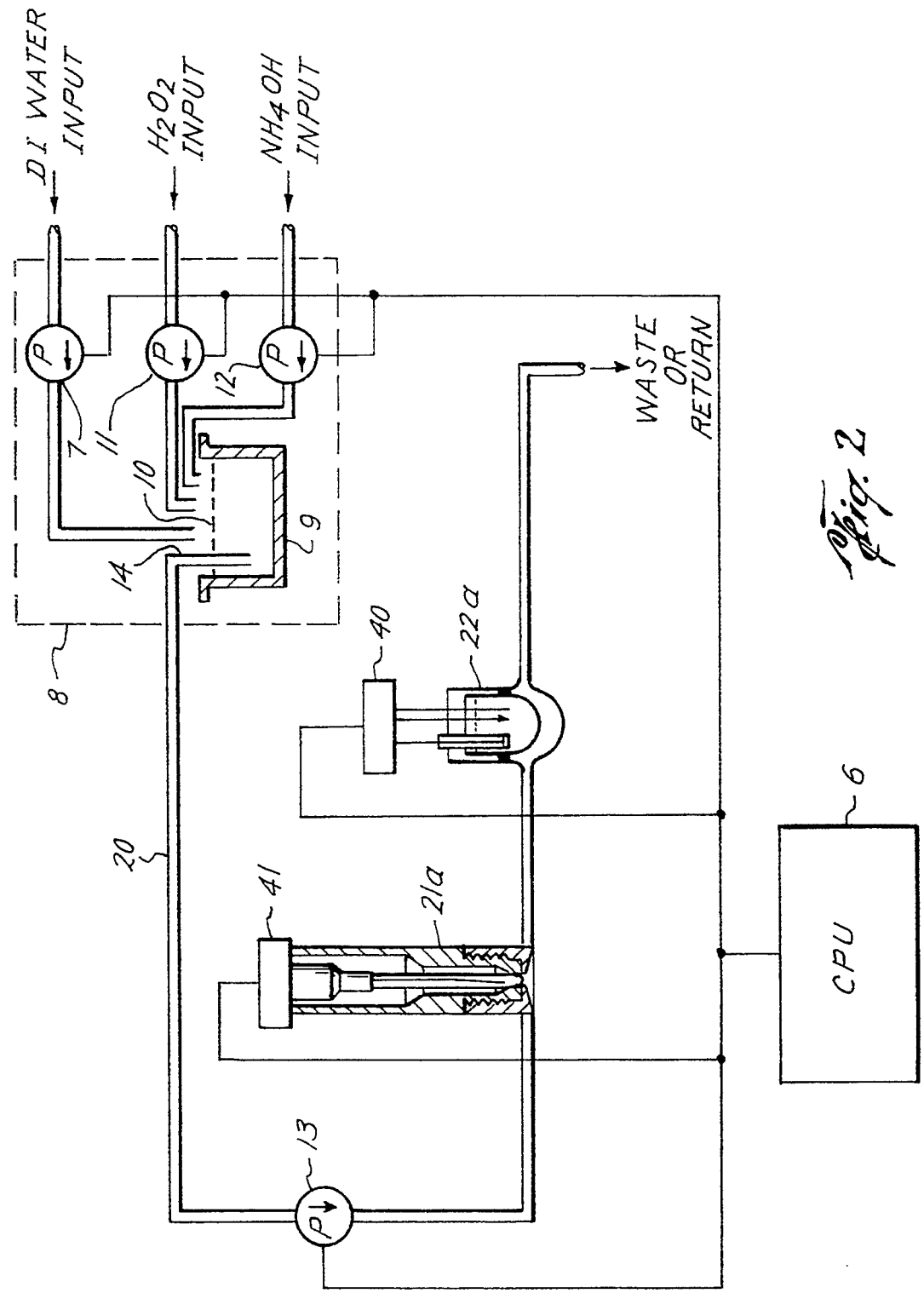
FIG. 2 is a schematic diagram of a measurement and control system of FIG. 1, showing a particular use of a potentiometric sensor and an amperometric sensor.

Thus, as shown in FIG. 2, when approach A is chosen, sensor 21 is a potentiometric sensor, while sensor 22 is an amperometric sensor. In approach A, a potentiometric sensor 21a is used to determine the concentration of $NH_3$ in the sample solution and an amperometric sensor 22a is used to determine the concentration of $H_2O_2$. With approach A, each specific sensor directly measures one of the two concentration levels. That is, the amperometric sensor 22a detects the $H_2O_2$ concentration level and the potentiometric sensor 21a detects the $NH_3$ concentration level.

The preferred type of potentiometric sensor is a gas-diffusion $NH_3$ sensor. However, an ordinary pH glass electrode can also be utilized. The addition of $H_2O_2$ to an aqueous $NH_3$ solution will shift the following equilibrium reaction to the right:

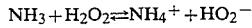

In turn, the following coupled equilibrium reaction will be shifted to the left:

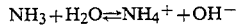

The resulting reduction in the $OH^-$ concentration will result in an increase in the $H^+$ concentration and a decrease in pH.

One type of gas-diffusion sensor for detecting $NH_3$ is shown in FIG. 5 and further described later in reference to FIG. 5. A preferred type of amperometric sensor is shown in FIG. 6 and is also described later in reference to FIG. 6.

Figure 3:
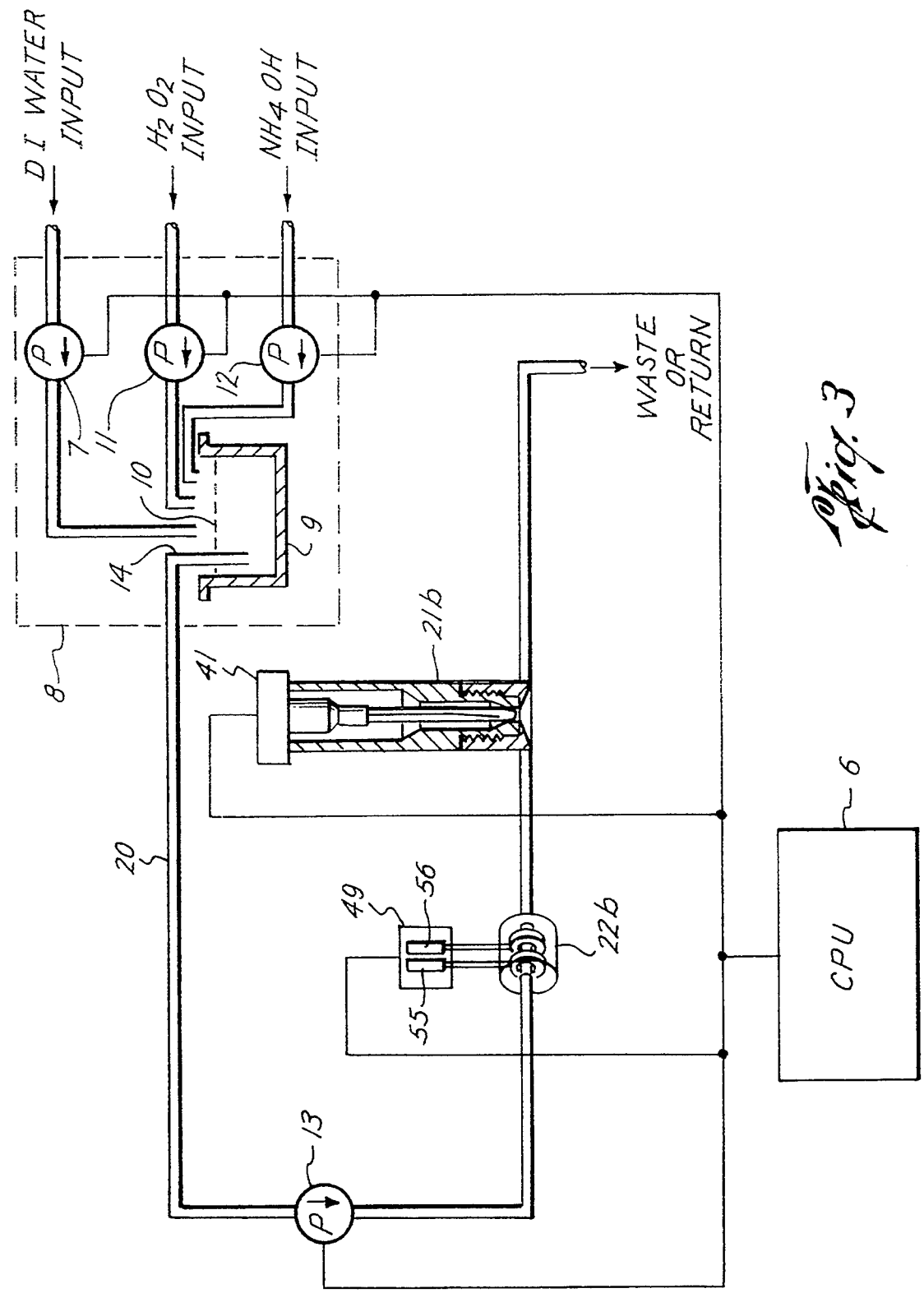
FIG. 3 is a schematic diagram of a measurement and control system of FIG. 1, showing a particular use of a conductivity sensor and a potentiometric sensor.

When approach B is chosen, sensor 21 is a potentiometric sensor, while sensor 22 is a conductivity sensor. Approach B is illustrated in FIG. 3. A potentiometric sensor 21b detects the $NH_3$ concentration, but a conductivity sensor 22b cannot separately detect the concentration level of $H_2O_2$. What actually occurs is that the conductivity sensor 22b detects the total conductivity of the solution, giving an indication of total ionic species in the solution. However, since the concentration of $NH_3$ is known from the potentiometric sensor 21b, this value is then used to compute the concentration of $H_2O_2$ from the ionic conductivity reading and the empirical equation which relates the ionic conductivity to the $H_2O_2$ and $NH_3$ concentrations, as well as temperature. One preferred type of conductivity sensor is shown in FIG. 7 and is later described in reference to FIG. 7.

Figure 4:
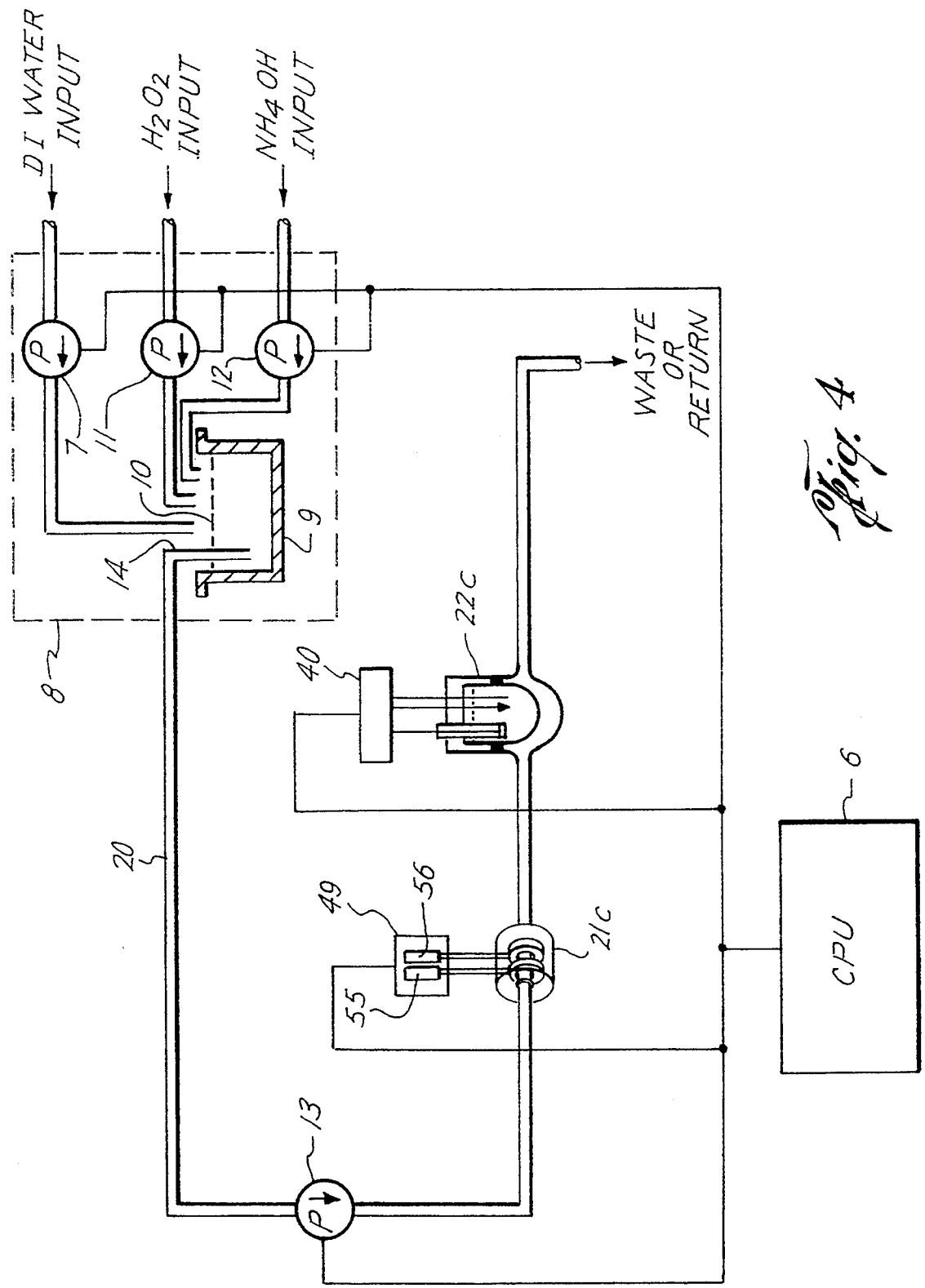
FIG. 4 is a schematic diagram of a measurement and control system of FIG. 1, showing a particular use of a conductivity sensor and an amperometric sensor.

With approach C, sensor 21 is a conductivity sensor, while sensor 22 is an amperometric sensor. Approach C is illustrated in FIG. 4. The $H_2O_2$ concentration is determined specifically by an amperometric sensor 22c. This value is then used to compute the concentration of $NH_3$ from the total ionic conductivity reading obtained from a conductivity sensor 21c. The experimentally derived empirical equation which relates the ionic conductivity to the $H_2O_2$ and $NH_3$ concentrations, as well as temperature, can be used to solve for the missing specie.

In comparing the three approaches, approach A is the best approach from an analytical standpoint since this approach utilizes specific detection of $NH_3$ and $H_2O_2$. The other two approaches rely on the ionic conductivity measurement of all of the ions in the solution, so it is a nonspecific sensor. By establishing one of the species ($NH_3$ by potentiometry or $H_2O_2$ by amperometry), the conductivity measurement can be used to compute the concentration of the other specie.

Since $$NH_3 + H_2O_2 \rightleftharpoons NH_4^+ + HO_2^-$$

there are two major ions of interest in the SC-1 solution. In approach A, the two molecular species on the left side of the above equation are determined. Approaches B and C determine one of the molecular species on the left side of the equation and the sum of the ionic species on the right side of the equation. Therefore, the missing species on the left side of the equation can be readily computed. Thus, the conductivity sensor ultimately functions to determine the concentration level of the other species.

As noted, approach A is the best from an analytical point of view. However, approach B appears to be easiest of the three approaches to implement, as well as being the most economical. Approach C is the approach pursued in the previously noted original parent application and is illustrated in FIG. 4. Furthermore, it should be noted that amperometric sensors are in general more sensitive than potentiometric sensors. In general, amperometric sensors display a linear dependence upon the molar concentration for dilute solutions, while potentiometric sensors have a logarithmic response.

Referring to FIG. 5, a particular gas-diffusion potentiometric sensor 25 for sensing ammonia gas is shown. An ammonia gas sensing electrode 26 is comprised of a combination pH/glass electrode 24 housed within a plastic tube 28. The electrode 26 is separated from the sample solution by a hydrophobic membrane 27. The tube 28 is filled with an ammonium chloride solution 29. The sensor 25 is constructed so that the electrode 24 is disposed proximal to the membrane 27, wherein only a thin fluid layer of the ammonium chloride solution exists between the membrane 27 and electrode 26. A sensor of this type is well known in the prior art. An example of a potentiometric sensor for use with the present invention is Model 95-12 ammonia electrode manufactured by Orion Research Inc. of Boston Mass. Also, generally an electrical circuit 41 is coupled to and used with the potentiometric sensor. Such circuitry 41 is well-known in the prior art and is shown in FIGS. 2 and 3. Circuit 41 also includes the necessary I/O functions for coupling the signal(s) to a processor.

Referring to FIG. 6, a particular amperometric sensor 30 for use with the present invention is shown. The purpose of the amperometric sensor 30 is to quantitatively determine the $H_2O_2$ concentration of the sample solution sent to it. The operation of an amperometric oxidation of $H_2O_2$ is well known in the prior art. Techniques for detecting $H_2O_2$ are described in U.S. Pat. Nos. 4,427,772; 4,340,448; 4,909,908; and particularly 3,902,970. However, the prior art only employs amperometry for very dilute solutions. The present invention is unique, since $H_2O_2$ is measured in the percent by volume composition range rather than in the ppb (parts per billion) or ppm (parts per million) range. A self-contained amperometric sensors of this type are well known in the prior art. One such sensor (which is comprised of electrodes, membrane and jacket, but requires to be placed in a flow through cell), is available as "Model 4006" from Universal Sensors, Inc. of Metairie, La.

A special type of amperometric sensor is the membrane type amperometric cell described in the aforementioned original application and which is shown in FIG. 6. This amperometric sensor 30 is desirable for use in the present application when used with a hydrophobic micro-porous membrane 34. This type of sensor 30 relies upon $H_2O_2$ gas diffusion from the sample solution 33 through a hydrophobic membrane 34 and into the inner electrolyte solution 36. The inner electrolyte solution 36 can be a 0.1 molar $NH_3/NH_4Cl$ buffer with a pH of approximately 8.0. Oxidation of $H_2O_2$ occurs at a platinum working electrode 35a, although other working electrodes could also be used. The oxidation occurs at a potential that is typically +600 mV with respect to a Ag/AgCl reference electrode 35b. The electrical signal is proportional to the concentration of $H_2O_2$. Electrode 35c, which is desirable but not necessarily needed, is an auxiliary (or counter) electrode.

Membranes having different properties can be selected depending on the particular measurement scheme desired. The membrane 34 must be a micro-porous hydrophobic membrane. Hydrophobic membranes are not susceptible to wetting by water. Transport of volatile molecular species, such as $H_2O_2$, occurs by a diffusion process and the diffusion of $H_2O_2$ across the membrane occurs at a rate governed by properties of membrane and temperature.

A variety of amperometric sensors can be readily used in place of sensor 30. However, in order to provide the necessary electrode potential, an electrical power source along with appropriate current monitoring circuitry is typically coupled to and used with sensor 30, as shown in FIGS. 2 and 4. A potentiostatic circuit 40 is utilized to provide these functions. Potentiostatic circuit 40 is coupled to the amperometric sensor to establish the necessary voltage at the working electrode 35a, as well as a current monitoring circuit to measure the current. The value of the current measured between the working and auxiliary electrodes is proportional to the concentration of $H_2O_2$ of the liquid present in the amperometric sensor. In the case of the present invention, the potentiostatic circuit 40 must be capable of measuring currents in the tens of microampere range. Circuit 40 also provides the necessary input/output (I/O) function for coupling the signal(s) to a processor.

Generally, amperometric sensors are operated with a continuous DC potential being applied to the working electrode. However, due to the high concentration levels of the present invention, it is preferable to use a positive voltage pulse and then to obtain a current reading after a lapse of a predefined time period. This is known as chronoamperometry. The duration of the pulse should be of a short duration, which is limited by the speed of the potentiostat and computer acquisition system. FIG. 8 shows a representative double-step, or double-pulse, (square-wave) chronoamperometric voltage waveform 50. Each step (positive and negative) has approximately a 1.5 second duration.

Figure 9:
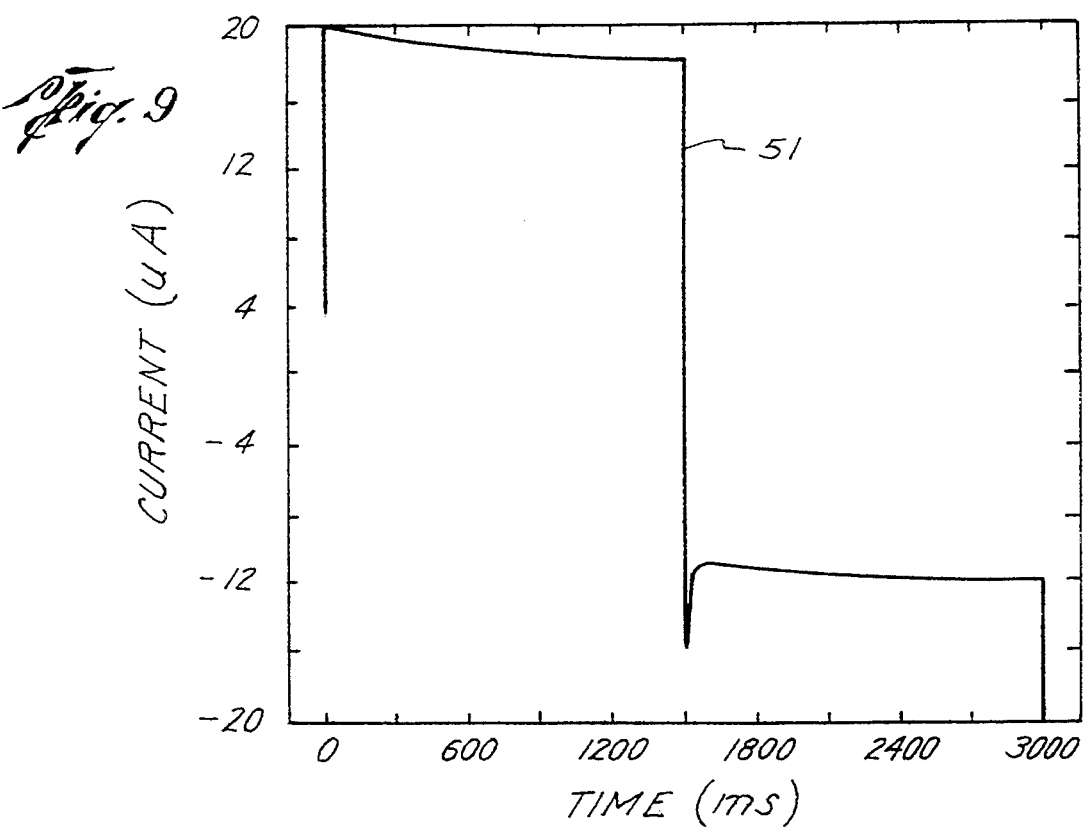
FIG. 9 is a graphic illustration of a current response to the voltage pulse of FIG. 8 and in which the sampled solution is SC-1.
Figure 10:
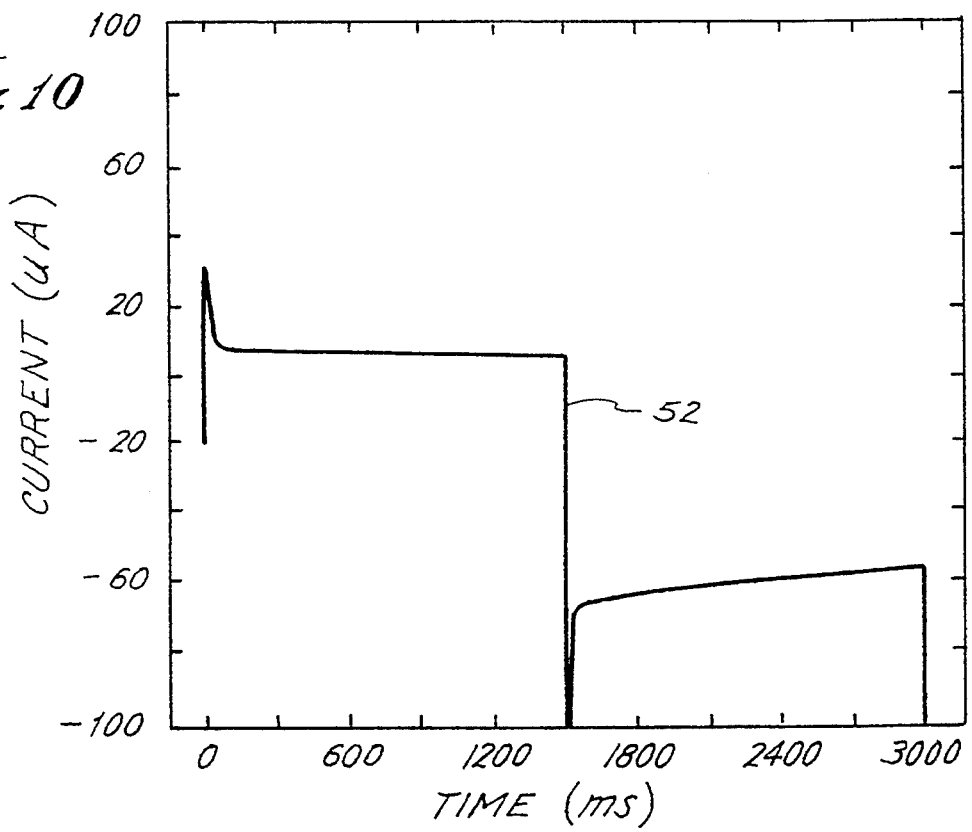
FIG. 10 is a graphic illustration of a current response to the voltage pulse of FIG. 8 and in which the sampled solution is SC-2.

A current response to the voltage pulse 50 will have some variation during the time the pulse is applied. Thus, it is important for quantitative purposes that the current be measured at some specific time period after the end of each voltage period. The current is measured relative to a zero level, which is defined as when the potentiostat in the potentiostatic circuit 40 is not actively coupled (that is, at open circuit). FIGS. 9 and 10 illustrate a current response for an SC-1 and SC-2 solutions, which are obtained when the pulse waveform 50 is applied. FIG. 9 illustrates a current waveform 51 obtained from a SC-1 solution when pulse 50 is applied. FIG. 10 illustrates a current waveform 52 obtained from a SC-2 solution when pulse 50 is applied.

For SC-2 solutions, the amount of $H_2O_2$ diffusion through the membrane is less than that for SC-1 solutions of corresponding $H_2O_2$ concentrations. For SC-2 solutions, it is, preferable to use the current response to the negative pulse for greater sensitivity. The magnitude of this current response is proportional to the $H_2O_2$ concentration. A reduction process occurs during this negative pulse which may involve $O_2$ reduction.

Additionally, a continued presence of bubbles within the amperometric sensor can also present problems. The bubbles are produced by the catalytic decomposition of $H_2O_2$, as well as by the actual measurement process. The oxidation reaction produces oxygen by the reaction;

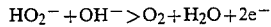

$$HO_2^- + OH^- > O_2 + H_2O + 2e^-$$

To counteract the bubbles, the positive potential pulse is followed by a negative potential pulse of equal duration and of the same absolute amplitude as the initial pulse, which is as shown in FIG. 8. The negative pulse aids in reducing the production of oxygen.

Another technique for minimizing the bubbles is to alternate the sample stream with a DI water stream between measurements. The $H_2O_2$ will diffuse back out of the electrode into the DI water, due to the concentration gradient.

A number of known circuitry (as well as devices) can be readily used to provide these functions for the amperometric sensor. Additionally, as shown in the afore-mentioned parent application (Ser. No. 08/017,224), a pH sensor can be incorporated to measure the pH of the sample stream. Alternatively, a pH indication can be used rather than a gas diffusion type of $NH_3$ sensor.

In reference to conductivity sensors, electrodeless conductivity sensors (also known as toroidal or inductance type sensors) are preferred. A particular conductivity sensor 45 for use with the present invention is shown in FIG. 7. These toroidal sensors are clad in an inert plastic housing 46, such as a housing constructed from a fluoro polymer material (for example, a Teflon TM material, such as polytetrafluoroethylene (PTFE)). A primary toroid 47 and a secondary toroid 48 reside within housing 46. The sample solution is made to flow through the core of the toroids 47 and 48. The sensor 45 is usually coupled to an electrical circuit 49, which provides the necessary electronics to operate sensor 45. The circuit 49 typically includes an oscillator 55 and a detector 56. The circuit 49 also includes the necessary I/O function for coupling the signal(s) to a processor.

In operation, the primary toroid 47 is coupled to the oscillator 55, while the secondary toroid 48 is coupled to the detector 56. The amount of induced field generated and coupled from the primary toroid 47 to the secondary toroid 48 (which is then measured by the detector) is proportional to the ions present in the sample solution disposed between the toroids. The operation of this type of conductivity sensor is well known in the art.

Although a variety of conductivity sensors can be used, it is preferable to use a rapid response sensor. Sensors having this measurement characteristics are well-known in the prior art and provide for rapid response to a flowing fluid. An example of a conductivity sensor for use with the present invention is manufactured by Electrochemical Devices of Yorba Linda, Calif., which uses a T21 transmitter and PTFE clad toroidal sensor.

Conductivity sensors which utilize metal electrodes in contact with the solution being measured are not recommended, since these electrodes will cause catalytic decomposition of the $H_2O_2$ (See for example, "Electrodeless Conductivity"; T. S. Light; American Chemical Society Symposium Series No. 390; Electrochemistry, Past and Present; 1989; pp.429–441). However, it is possible that the more conventional two electrode conductivity cells might be used. In certain instances, passive layers will form in peroxide containing solutions on metal conductivity probes, which would enable the use of the two electrode type conductivity cells. Such passive layers will prevent the catalytic decomposition of peroxide and the actual dissolution of the conductivity probe in these highly corrosive solutions.

In order to provide automated sensing of bath 10, as well as automated control of bath 10, a processor (denoted by CPU 6) is utilized with the present invention. The CPU 6 is coupled, directly or indirectly, to various devices of FIGS. 1–4. Thus, CPU 6 is coupled to control the operation of pumps 7, 11–13 and sensors 21a–c, 22a–c, circuits 40, 41 and 49, as well as to a pH sensor (when used) and a temperature sensor (when used) as shown in the afore-mentioned parent application.

In operation, when a chemical concentration (such as $H_2O_2$) determination is to be made, pump 13 is activated to draw a sample of the solution from bath 10. The sensors 21 and 22 perform their tasks, depending on the type of sensor used. The measurement values are coupled to and processed by CPU 6 to determine the concentration levels. Then, if necessary, appropriate metering pumps 7, 11 and/or 12 can be activated by CPU 6 for chemical concentration adjustment of bath 10. This operation can be performed in-situ while the bath is being used.

Referring to FIGS. 2–4, the system of FIG. 1 is repeated, but with the substitution of sensors from FIGS. 5–7 for sensors 21 and 22. FIG. 2 exemplifies one design for implementing the approach noted as approach A. FIG. 3 exemplifies one design for implementing the approach noted as approach B. FIG. 4 exemplifies one design for implementing the approach noted as approach C. In these implementations in applying the technique of the present invention, measurements, controls and computations are performed by the operation of CPU 6.

Additionally, a temperature sensor can be located at the input of the first sensor 21a–c. Since the concentration measurements are somewhat dependent on the temperature of the solution, it is preferred to utilize a temperature sensor to measure the temperature of the solution coupled to the sensors 21 and 22. Essentially, temperature is an independent variable which must be considered, if not held constant. For example, the conductivity measurement is a means of correlating an empirical value to the concentration level of the component being measured. Since temperature affects this calculation, the temperature sensor is coupled to measure the liquid temperature at the particular sensor. The measurement value of the temperature, along with the sensor outputs are processed by CPU 6 in its calculations for determining the concentration levels of the chemical species.

Thus, a fully automated wet processing bath measurement, analysis and feedback control system is described for use in processing semiconductor wafers, especially silicon wafers. It is to be appreciated that although the present invention is described in references to SC-1 type solution, other solutions, such as SC-2 type solution, can be monitored and controlled by the practice of the present invention. Essentially, the present invention is utilized for baths containing $H_2O_2$ and a second specie, which is either an acid or a base.

I claim:

1. A method for monitoring concentration levels of a first chemical specie, which is hydrogen peroxide ($H_2O_2$), and a second chemical specie, which is either an acid or a base, in a multi-component aqueous bath utilized in semiconductor processing, in order to provide feedback to control an amount of said $H_2O_2$ and said second chemical specie present in said bath comprising the steps of:

sampling said bath to obtain a solution sample;
performing a potentiometric detection of said sample to measure concentration of said second chemical specie in said sample;
performing an amperometric detection of said sample to measure concentration of said $H_2O_2$ in said sample;
analyzing concentration measurements of said sample to determine if said $H_2O_2$ and said chemical specie in said bath are within set concentration levels;
introducing additional $H_2O_2$, said second chemical specie, other compensating chemical or diluting agent into said bath to adjust said bath to within said set concentration levels, if adjustment is needed;
wherein said bath is monitored and compensated to maintain said set concentration levels of $H_2O_2$ and said second chemical specie in said bath.

2. The method of claim 1 wherein said second chemical specie is ammonium hydroxide ($NH_4OH$).

3. The method of claim 1 wherein said bath is comprised of a $H_2O_2$—$NH_4OH$—$H_2O$ solution which is utilized for wafer cleaning.

4. A method for monitoring concentration levels of a first chemical specie, which is hydrogen peroxide ($H_2O_2$), and a second chemical specie, which is either an acid or a base, in a multi-component aqueous bath utilized in semiconductor processing, in order to provide feedback to control an amount of said $H_2O_2$ and said second chemical specie present in said bath comprising the steps of:

sampling said bath to obtain a solution sample;
performing a potentiometric detection of said sample to measure concentration of said second chemical specie in said sample;
performing a conductivity detection of said sample to measure total ionic conductivity in said sample;
calculating a difference of ionic conductivity attributable to measured concentration of said second chemical by said potentiometric detection from said total ionic conductivity to determine concentration of said $H_2O_2$ in said sample;
analyzing concentration measurements of said sample to determine if said $H_2O_2$ and said second chemical specie in said bath are within set concentration levels;
introducing additional $H_2O_2$, said second chemical specie, other compensating chemical or diluting agent into said bath to adjust said bath to within said set concentration levels, if adjustment is needed;
wherein said bath is monitored and compensated to maintain said set concentration levels of $H_2O_2$ and said second chemical specie in said bath.

5. The method of claim 4 wherein said second chemical specie is ammonium hydroxide ($NH_4OH$).

6. The method of claim 4 wherein said bath is comprised of a $H_2O_2$—$NH_4OH$—$H_2O$ solution which is utilized for wafer cleaning.

7. A method for monitoring concentration levels of a first chemical specie, which is hydrogen peroxide ($H_2O_2$), and a second chemical specie, which is either an acid or a base, in a multi-component aqueous bath utilized in semiconductor processing, in order to provide feedback to control an amount of said $H_2O_2$ and said second chemical specie present in said bath comprising the steps of:

sampling said bath to obtain a solution sample;
performing an amperometric detection of said sample to measure concentration of said $H_2O_2$ in said sample;
performing a conductivity detection of said sample to measure total ionic conductivity in said solution;
calculating a difference of ionic conductivity attributable to measured concentration of said $H_2O_2$ by said amperometric detection from said total ionic conductivity to determine concentration of said $H_2O_2$ in said sample;
analyzing concentration measurements of said sample to determine if said $H_2O_2$ and said second chemical specie in said bath are within set concentration levels;
introducing additional $H_2O_2$, said second chemical specie, other compensating chemical or diluting agent into said bath to adjust said bath to within said set concentration levels, if adjustment is needed;
wherein said bath is monitored and compensated to maintain said set concentration levels of $H_2O_2$ and said second chemical specie in said bath.

8. The method of claim 7 wherein said second chemical specie is ammonium hydroxide ($NH_4OH$).

9. The method of claim 7 wherein said bath is comprised of a $H_2O$—$NH_4OH$—$H_2O$ solution which is utilized for wafer cleaning.

10. An apparatus for monitoring concentration levels of a first chemical specie, which is hydrogen peroxide ($H_2O_2$) and a second chemical specie, which is either an acid or a base, present in a multi-component aqueous bath utilized in semiconductor processing, in order to provide feedback and control to adjust an amount of said $H_2O_2$ and said second chemical specie present in said bath comprising:

a sampling device for obtaining a sample of said solution from said bath and introducing said sample into a flow path;
a potentiometric sensor coupled to said flow path for receiving said sample and for performing a potentiometric detection of said sample to measure concentration of said second chemical specie in said sample;

an amperometric sensor coupled to said flow path for receiving said sample and for performing an amperometric detection of said sample to measure concentration of $H_2O_2$ in said sample;

a processor coupled to said potentiometric and amperometric sensors for obtaining data pertaining to said concentration of said second chemical specie and $H_2O_2$, processing said data to determine if said concentration of said second chemical specie and $H_2O_2$ is within set concentration levels and introducing compensating chemical or diluting agent into said bath to adjust said bath to within said set concentration levels for said bath;

wherein said bath is monitored and compensated by said processor to maintain control of said set concentration levels of $H_2O_2$ and said second chemical specie.

11. The apparatus of claim 10 further including a first pump and a second pump, each coupled to said bath and said processor, wherein said first pump is used to pump $H_2O_2$ into said bath under control of said processor and said second pump is used to pump said second chemical specie into said bath under control of said processor, and wherein said second chemical specie is ammonium hydroxide ($NH_4OH$).

12. The apparatus of claim 10 further including a first pump and a second pump, each coupled to said bath and said processor, wherein said first pump is used to pump $H_2O_2$ into said bath under control of said processor and said second pump is used to pump said second chemical specie into said bath under control of said processor, and wherein said bath is comprised of a $H_2O_2$—$NH_4OH$—$H_2O$ solution which is utilized for wafer cleaning.

13. An apparatus for monitoring concentration levels of a first chemical specie, which is hydrogen peroxide ($H_2O_2$) and a second chemical specie, which is either an acid or a base, present in a multi-component aqueous bath utilized in semiconductor processing, in order to provide feedback and control to adjust an amount of said $H_2O_2$ and said second chemical specie present in said bath comprising:

a sampling device for obtaining a sample of said solution from said bath and introducing said sample into a flow path;

a potentiometric sensor coupled to said flow path for receiving said sample and for performing a potentiometric detection of said sample to measure concentration of said second chemical specie in said sample;

a conductivity sensor coupled to said flow path for receiving said sample and for performing a conductivity detection of said sample to measure total ionic conductivity in said sample;

a processor coupled to said potentiometric and conductivity sensors for obtaining data pertaining to said concentration of said second chemical specie and total ionic conductivity, computing a difference of ionic conductivity attributable to measured concentration of said second chemical by said potentiometric detection from said total ionic conductivity to determine concentration of said $H_2O_2$ in said sample, processing said data to determine if said concentration of said second chemical specie and $H_2O_2$ is within set concentration levels, and introducing compensating chemical or diluting agent into said bath to adjust said bath to within said set concentration levels for said bath;

wherein said bath is monitored and compensated by said processor to maintain control of said set concentration levels of $H_2O_2$ and said second chemical specie.

14. The apparatus of claim 13 further including a first pump and a second pump, each coupled to said bath and said processor, wherein said first pump is used to pump $H_2O_2$ into said bath under control of said processor and said second pump is used to pump said second chemical specie into said bath under control of said processor, and wherein said second chemical specie is ammonium hydroxide ($NH_4OH$).

15. The apparatus of claim 13 further including a first pump and a second pump, each coupled to said bath and said processor, wherein said first pump is used to pump $H_2O_2$ into said bath under control of said processor and said second pump is used to pump said second chemical specie into said bath under control of said processor, and wherein said bath is comprised of a $H_2O_2$—$NH_4OH$—$H_2O$ solution which is utilized for wafer cleaning.

16. An apparatus for monitoring concentration levels of a first chemical specie, which is hydrogen peroxide ($H_2O_2$) and a second chemical specie, which is either an acid or a base, present in a multi-component aqueous bath utilized in semiconductor processing, in order to provide feedback and control to adjust an amount of said $H_2O_2$ and said second chemical specie present in said bath comprising:

a sampling device for obtaining a sample of said solution from said bath and introducing said sample into a flow path;

an amperometric sensor coupled to said flow path for receiving said sample and for performing an amperometric detection of said sample to measure concentration of said $H_2O_2$ in said sample;

a conductivity sensor coupled to said flow path for receiving said sample and for performing a conductivity detection of said sample to measure total ionic conductivity in said sample;

a processor coupled to said amperometric and conductivity sensors for obtaining data pertaining to said concentration of said $H_2O_2$ and total ionic conductivity, computing a difference of ionic conductivity attributable to measured concentration of said $H_2O_2$ by said amperometric detection from said total ionic conductivity to determine concentration of said second chemical specie in said sample, processing said data to determine if said concentration of said second chemical specie and $H_2O_2$ is within set concentration levels, and introducing compensating chemical or diluting agent into said bath to adjust said bath to within said set concentration levels for said bath;

wherein said bath is monitored and compensated by said processor to maintain control of said set concentration levels of $H_2O_2$ and said second chemical specie.

17. The apparatus of claim 16 further including a first pump and a second pump, each coupled to said bath and said processor, wherein said first pump is used to pump $H_2O_2$ into said bath under control of said processor and said second pump is used to pump said second chemical specie into said bath under control of said processor, and wherein said second chemical specie is ammonium hydroxide (NH$_4$OH).

18. The apparatus of claim 16 further including a first pump and a second pump, each coupled to said bath and said processor, wherein said first pump is used to pump H$_2$O$_2$ into said bath under control of said processor and said second pump is used to pump said second chemical specie into said bath under control of said processor, and wherein said bath is comprised of a H$_2$O$_2$—NH$_4$OH—H$_2$O solution which is utilized for wafer cleaning.

19. The apparatus of claim 16 further including a first pump and a second pump, each coupled to said bath and said processor, wherein said first pump is used to pump H$_2$O$_2$ into said bath under control of said processor and said second pump is used to pump said second chemical specie into said bath under control of said processor, and wherein said second chemical specie is hydrochloric acid (HCl).

* * * * *

UNITED STATES PATENT AND TRADEMARK OFFICE
CERTIFICATE OF CORRECTION

PATENT NO : 5,439,569
DATED : August 8, 1995
INVENTOR(S): Ronald A. Carpio

It is certified that error appears in the above-identified patent and that said Letters Patent are hereby corrected as shown below:

Column 2, line 1, "$2H_2O_2 > 2H_2O+O_2$" should be --$2H_2O_2 \rightarrow 2H_2O+O_2$--.

Column 2, line 8, "$2NH_3+6OH^- > N_2+6H_2O+6e^-$" should be --$2NH_3+6OH^- \rightarrow N_2+6H_2O+6e^-$--.

Column 5, line 18, "$H_2O_2-H_2O$" should be --$H_2O_2-HF-H_2O$--.

Column 6, line 8, "$H_2O$" should be --$H_2O_2$--.

Column 9, line 27, "$HO_2^-+OH^- > O_2+H_2O+2e^-$" should be --$HO_2^-+OH^- \rightarrow O_2+H_2O+2e^-$--.

Signed and Sealed this

Twelfth Day of August, 1997

*Attest:*

BRUCE LEHMAN

*Attesting Officer*     *Commissioner of Patents and Trademarks*